(12) United States Patent
Li

(10) Patent No.: US 10,216,027 B2
(45) Date of Patent: Feb. 26, 2019

(54) DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 119 days.

(21) Appl. No.: 15/507,849

(22) PCT Filed: Mar. 25, 2016

(86) PCT No.: PCT/CN2016/077340
§ 371 (c)(1),
(2) Date: Mar. 1, 2017

(87) PCT Pub. No.: WO2017/049890
PCT Pub. Date: Mar. 30, 2017

(65) Prior Publication Data
US 2017/0293168 A1    Oct. 12, 2017

(30) Foreign Application Priority Data
Sep. 25, 2015  (CN) .......................... 2015 1 0624449

(51) Int. Cl.
*G02F 1/1335*    (2006.01)
*G02B 5/20*    (2006.01)
(Continued)

(52) U.S. Cl.
CPC ........... *G02F 1/1335* (2013.01); *G02B 5/204* (2013.01); *G02B 5/28* (2013.01); *G02B 5/3041* (2013.01); *G02B 5/3083* (2013.01); *G02B 5/32* (2013.01); *G02F 1/133509* (2013.01); *G02F 1/133514* (2013.01); *G02F 1/133615* (2013.01); *G02F 1/133621* (2013.01); *G02F 1/13363* (2013.01); *G02F 1/136209* (2013.01); *G02F 2001/13356* (2013.01); *G02F 2001/133521* (2013.01); *G02F 2001/133541* (2013.01); *G02F 2001/133545* (2013.01); *G02F 2001/133635* (2013.01)

(58) Field of Classification Search
CPC ............ G02F 1/1335; G02F 1/133615; G02F 1/133509; G02F 1/136209
See application file for complete search history.

(56) References Cited

U.S. PATENT DOCUMENTS

| 7,046,320 B2 * | 5/2006 | Hara ...................... G02B 5/285 349/105 |
| 2001/0030720 A1* | 10/2001 | Ichihashi ............. G02B 5/3016 349/106 |

(Continued)

FOREIGN PATENT DOCUMENTS

| CN | 101017279 A | 8/2007 |
| CN | 203259680 U | 10/2013 |

(Continued)

OTHER PUBLICATIONS

First Chinese Office Action dated Apr. 12, 2017.
(Continued)

*Primary Examiner* — Hoan C Nguyen
(74) *Attorney, Agent, or Firm* — Dilworth & Barrese, LLP.; Michael J. Musella, Esq.

(57) ABSTRACT

A display device includes a liquid crystal display panel (3) and a backlight source (2), and further includes a plurality of bandpass filters (1) corresponding to respective pixel units of the liquid crystal display panel (3), the bandpass filters (1) being configured to perform narrowband filtering on the light emergent from the backlight source (2). By adopting the bandpass filters (1), the narrowband filtering on the red, green and blue light is realized by using a narrowband interference filtering method, such that the effect of improving the gamut of the display device is achieved and the high-gamut display is realized.

20 Claims, 1 Drawing Sheet

(51) Int. Cl.
  *G02B 5/30* (2006.01)
  *G02B 5/28* (2006.01)
  *G02B 5/32* (2006.01)
  *G02F 1/13363* (2006.01)
  *G02F 1/1362* (2006.01)

(56) References Cited

U.S. PATENT DOCUMENTS

| | | | | |
|---|---|---|---|---|
| 2002/0171794 A1* | 11/2002 | Nakamura | ........ | G02F 1/133555 349/117 |
| 2014/0240640 A1* | 8/2014 | Roberts | ................ | G02B 6/0035 349/62 |
| 2014/0340620 A1* | 11/2014 | Zhang | ................ | G02F 1/133514 349/105 |
| 2014/0368766 A1 | 12/2014 | Shibata et al. | | |
| 2015/0085223 A1* | 3/2015 | Park | .................. | G02F 1/133615 349/65 |

FOREIGN PATENT DOCUMENTS

| | | | |
|---|---|---|---|
| CN | 105093685 A | 11/2015 | |
| CN | 204945576 U | 1/2016 | |

OTHER PUBLICATIONS

Search Report and Written Opinion dated Jun. 27, 2016 from State Intellectual Property Office of the P.R. China.
Second Chinese Office Action dated Sep. 20, 2017.

* cited by examiner

DISPLAY DEVICE

The application claims priority of Chinese Patent Application No. 201510624449.X filed on Sep. 25, 2015, the disclosure of which is incorporated herein by reference in its entirety as part of the present application.

TECHNICAL FIELD

The present disclosure relates to a technical field of display, and in particular, to a display device.

BACKGROUND

Gamut is a range region consisting of a quantity of colors that can be displayed by a display device. In natural world, the colors of a visible spectrum constitute the largest gamut space, and such gamut space contains all colors that can be seen by human eyes. A display technology is a medium of information presentation, and the display of the original colors of the object to the greatest degree is the target pursued by a high quality display device, which requires to further improve the gamut of a displayed product.

At present, in the technical field of liquid crystal display, the high-gamut display device is generally implemented in manners of attaching a quantum dot film, increasing quantum dot tubes, improving a backlight source and the like. However, the cost of the high-gamut display device realized by such manners is high, the difficulty in implementation is high and the gamut is not high enough.

SUMMARY

The present disclosure aims to provide a display device, to realize high-gamut display.

In order to solve the above technical problem, the present disclosure provides a display device, comprising a liquid crystal display panel and a backlight source, and further comprising a plurality of bandpass filters disposed in the display device and corresponding to a pixel array of the liquid crystal display panel, the bandpass filters being configured to perform narrowband filtering on light emergent from the backlight source.

Optionally, the pixel array includes a plurality of pixel units, each of the pixel units includes three sub-pixel units;

The plurality of bandpass filters are tri-bandpass filters in one-to-one correspondence with respective pixel units, and the tri-bandpass filter is capable of adjusting central wavelengths and half-height peak widths of red light, green light and blue light emitted from the three sub-pixel units constituting one pixel unit at the same time.

Optionally, the pixel array includes a plurality of pixel units, each of the pixel units includes three sub-pixel units;

The plurality of bandpass filters are mono-bandpass filters in one-to-one correspondence with the respective pixel units;

Each of the mono-bandpass filters is capable of adjusting a central wavelength and a half-height peak width of light of color corresponding thereto.

Optionally, the bandpass filters are disposed between the backlight source and the liquid crystal display panel, and are disposed on an emergent surface of the backlight source, or disposed on an incident surface of the liquid crystal display panel.

Optionally, the incident surface of the liquid crystal display panel is provided with a first polarizing sheet, and the emergent surface of the liquid crystal display panel is provided with a second polarizing sheet.

The bandpass filters are disposed between the backlight source and the first polarizing sheet;

Or, the bandpass filters are disposed between the first polarizing sheet and the liquid crystal display panel.

Optionally, the liquid crystal display panel includes an array substrate and a color filter substrate which are sequentially disposed on an emergent side of the backlight source, the array substrate is provided with the pixel array, and the bandpass filters are disposed on an incident surface of the array substrate.

Optionally, the bandpass filters are disposed on the emergent surface of the liquid crystal display panel.

Optionally, an incident surface of the liquid crystal display panel is provided with a first polarizing sheet, and the emergent surface of the display panel is provided with a second polarizing sheet.

The bandpass filters are disposed between the liquid crystal display panel and the second polarizing sheet.

Optionally, the liquid crystal display panel includes an array substrate and a color filter substrate which are sequentially disposed on an emergent side of the backlight source, and the bandpass filters are disposed on an emergent surface of the color filter substrate.

Optionally, wherein, the liquid crystal display panel includes an array substrate and a counter substrate which are sequentially disposed on an emergent side of the backlight source, and the bandpass filters are disposed on a side of the counter substrate facing the array substrate.

In the display device provided by the present disclosure, by adopting the bandpass filters, the modulation on the central wavelengths and half-height peak widths of the red, green and blue light is realized by using a narrowband interference filtering method, such that the narrowband filtering on the red, green and blue light is realized, the effect of improving the gamut of the display device is achieved and the high-gamut display is realized.

BRIEF DESCRIPTION OF THE DRAWINGS

The drawings are used to further understand the present disclosure, constitute part of the description, and explain the present disclosure together with the specific embodiments below instead of limiting the present disclosure.

Figure 1:
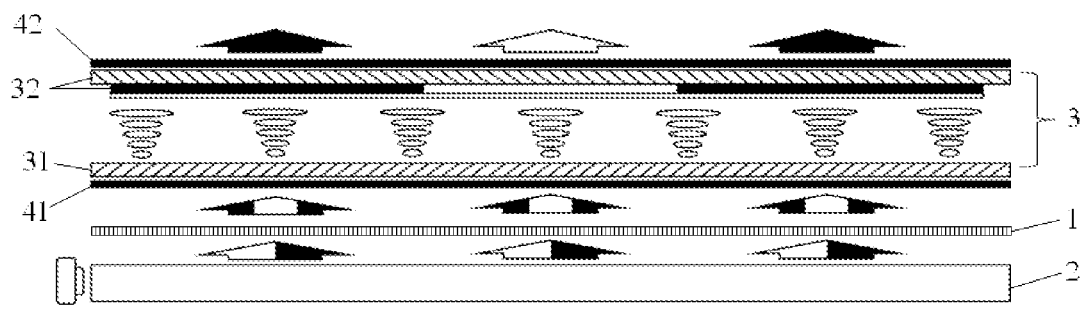
FIG. 1 is a structural schematic diagram of a display device provided by at least one embodiment of the present disclosure.

In the drawings, 1—bandpass filter; 2—backlight source; 3—liquid crystal display panel; 31—array substrate; 32—color filter substrate; 33—counter substrate; 41—first polarizing sheet; 42—second polarizing sheet.

DETAILED DESCRIPTION

The specific embodiments of the present disclosure are explained in detail in combination with the drawings. It should be understood that the specific embodiments described herein are merely intended for describing and explaining rather than limiting the present disclosure.

The present disclosure provides a display device, as shown in FIG. 1, including a liquid crystal display panel 3 and a backlight source 2, and further including a plurality of bandpass filters 1 disposed in the display device and corresponding to a pixel array of the liquid crystal display panel 3, the bandpass filters 1 being configured to perform narrowband filtering on light emergent from the backlight source 2.

Generally, the pixel array includes a plurality of pixel units; each of the pixel units includes a plurality of sub-pixel units (for example, red, green and blue sub-pixel units).

It is noted that FIG. 1 only illustrates one of the pixel units of the liquid crystal display panel 3 (including three sub-pixel units). Therefore, FIG. 1 only includes one bandpass filter 1 corresponding to the pixel array. In fact, the respective bandpass filters 1 correspond to the whole pixel array, and perform narrowband filtering on the backlight to be projected onto the pixel array or the backlight which has been projected to the pixel array, such that the emergent light of the display device is high-gamut light.

The bandpass filter 1 has a function of transmitting light within a certain waveband and partially cutting off light deviated from such waveband. In design, the bandpass filters are formed by laminating materials of different refractive indexes.

Specifically, the bandpass filter 1 includes a base substrate and a plurality of layers of film layers with different refractive indexes disposed on the base substrate, and by adjusting the thickness and refractive index of each film layer, different bandpass filters through which the light of different wavebands can be transmitted can be obtained. By using the interference principle of light, the transmission of the light of specific light spectrum can be realized, such that the effect of narrowband filtering can be realized.

The base substrate can be a glass substrate or a substrate made of resin material such as polyethylene terephthalate (PET), polybutylene terephthalate (PBT), polymethylmethacrylate (PMMA), and the like, and the filtering functional layer is of multilayered interference film structure.

The multilayered film layer can be made by adopting method such as physical vapor deposition, chemical vapor deposition, liquid phase film formation, and the like, wherein the most common method is physical vapor deposition, including: vacuum evaporation, sputtering, ion plating, etc.

Bu adopting the bandpass filters, the light corresponding to the sub-pixels of different colors can be adjusted by using a narrowband filtering method. For example, the central wavelengths and half-height peak widths of the red, green and blue light corresponding to the red, green and blue sub-pixels are modulated, such that the narrowband filtering of the light of the red, green and blue light is realized, the effect of improving the gamut of the display device is achieved, and the high-gamut display is realized.

It is noted that the bandpass filters in the present disclosure can be mono-bandpass filters, for example, the central wavelength and half-height peak width of one of the red, green and blue light are modulated; or can be tri-bandpass filters, which can modulate the central wavelengths and half-height peak widths of the red, green and blue light at the same time, so as to improve the gamut range to the greatest degree, and improve the display effect.

If the bandpass filters are the mono-bandpass filters, then one mono-bandpass filter is disposed in the region corresponding to each sub-pixel; for example, the mono-bandpass filter capable of adjusting the red light is disposed in the region corresponding to the red sub-pixel, the mono-bandpass filter capable of adjusting the green light is disposed in the region corresponding to the green sub-pixel, and the mono-bandpass filter capable of adjusting the blue light is disposed in the region corresponding to the blue sub-pixel.

If the bandpass filter is the tri-bandpass filter, then one tri-bandpass filter is disposed in the region corresponding to each pixel unit.

The bandpass filter of the present disclosure is a narrowband bandpass filter. The wide bandpass filter is introduced in detail below.

The bandpass filter has the function of transmitting the light within a certain waveband and cutting off the light deviated from such waveband. The waveband through which the light can be transmitted is a passband, and the inhibited wavebands at two sides of the passband are cutoff bands. The filter capable of transmitting light of short waveband is a shortwave pass filter, and the filter capable of transmitting light of long waveband is a longwave pass filter.

In the present disclosure, as one implementing mode, the narrow bandpass filter is a narrow bandpass filter formed by dual cutoff combined filters consisting of a combined structure of the shortwave pass filter and the longwave pass filter.

The dual cutoff combined filters, i.e., the combined structure of the shortwave pass filter and the longwave pass filter, is the combination of $$\left(\frac{H}{2}L\frac{H}{2}\right)^m \text{ and } \left(\frac{L}{2}H\frac{L}{2}\right)^n$$

(these two formulas represent the structure of the longwave pass filter and the structure of the shortwave pass filter respectively).

$$\left(\frac{H}{2}L\frac{H}{2}\right)^m$$

represents the structure is comprised of m tri-layer film layers, and these tri-layer film layers are respectively: a layer of high-refractive index film layer with half optical thickness, a layer of low-refractive index film layer with one optical thickness and another layer of high-refractive index film layer with half optical thickness.

$$\left(\frac{L}{2}H\frac{L}{2}\right)^n$$

represents the structure is comprised of n tri-layer film layers, and these tri-layer film layers are respectively: a layer of low-refractive index film layer with half optical thickness, a layer of high-refractive index film layer with one optical thickness and another layer of low-refractive index film layer with half optical thickness.

Wherein, H and L represent a high-refractive index film layer and a low-refractive index film layer with an optical thickness of $\lambda/4$, H/2 and L/2 represent a high-refractive index film layer and a low-refractive index film layer with an optical thickness of $\lambda/8$, m and n represent series and are positive integers, and $\lambda$ is the wavelength of light. The narrow bandpass filter is combined by a longwave pass filter and a shortwave pass filter, and different passbands can be realized by properly selecting the values of m and n.

As for the red narrow bandpass filter, the red longwave pass filter is configured to cut off the waves shorter than red wavebands in wavelength, and the red shortwave pass filter is configured to cut off the waves longer than the red wavebands in wavelength.

As for the green narrow bandpass filter, the green longwave pass filter is configured to cut off the waves shorter than green wavebands in wavelength, and the green shortwave pass filter is configured to cut off the waves longer than the green wavebands in wavelength.

As for the blue pass filter, the blue longwave pass filter is configured to cut off the waves shorter than blue wavebands in wavelength, and the blue shortwave pass filter is configured to cut off the waves longer than the blue wavebands in wavelength.

The narrow bandpass filter of each color is comprised of a longwave pass filter and a shortwave pass filter of the corresponding color. The longwave pass filter and the shortwave pass filter can be attached together, and can also be attached to the two sides of the base substrate respectively, and the projections thereof on the base substrate coincide. The positions of the longwave pass filter and the shortwave pass filter relative to the array substrate or backlight source are not limited.

Correspondingly, the display device provided by the present disclosure has the following two implementing modes:

In the first implementation mode, the array substrate of the liquid crystal display panel includes a plurality of pixel units, each of which includes three sub-pixel units; the plurality of bandpass filters are tri-bandpass filters in one-to-one correspondence with the respective pixel units, and the tri-bandpass filters is capable of adjusting the central wavelengths and half-height peak widths of the red light, green light and blue light at the same time.

In the second implementation mode, the array substrate of the liquid crystal display panel includes a plurality of pixel units, each of which include three sub-pixel units; the plurality of bandpass filters are mono-bandpass filters in one-to-one correspondence with the respective sub-pixel units, and each mono-bandpass filter is capable of adjusting the central wavelength and half-height peak width of light of color corresponding thereto.

The above two implementation modes of the present disclosure will be explained in detail through specific embodiments below.

FIG. 1 is a structural schematic diagram of a display device provided by a first embodiment of the present disclosure. The display device includes a backlight source 2 and a liquid crystal display panel 3, bandpass filters 1 being disposed between the backlight source 2 and the liquid crystal display panel 3.

Further, an incident surface of the liquid crystal display panel 3 is provided with a first polarizing sheet 41, an emergent surface of the liquid crystal display panel 3 is provided with a second polarizing sheet 42, and the bandpass filters 1 are disposed between the backlight source 2 and the first polarizing sheet 41.

In the present embodiment, the bandpass filter 1 is a tri-bandpass filter, can be separately formed on a glass substrate and disposed between the backlight source 2 and the first polarizing sheet 41 to realize performing narrowband filtering on the light emitted from the backlight source 2.

Figure 2:
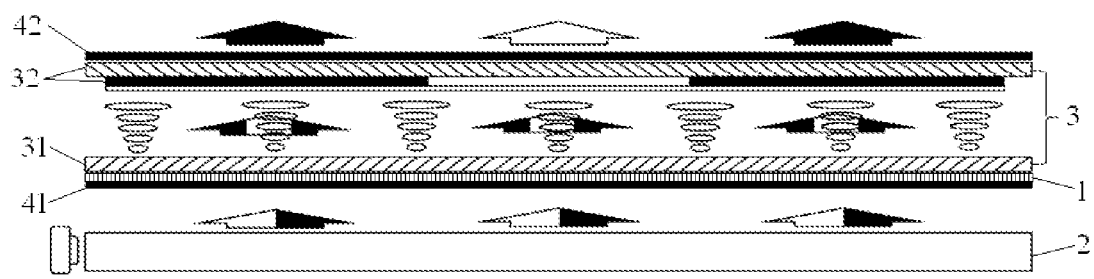
FIG. 2 is a structural schematic diagram of a display device provided by at least one embodiment of the present disclosure.

FIG. 2 is a structural schematic diagram of a display device provided by a second embodiment of the present disclosure. The display device includes a backlight source 2 and a liquid crystal display panel 3, bandpass filters 1 being disposed between the backlight source 2 and the liquid crystal display panel 3. Further, an incident surface of the liquid crystal display panel 3 is provided with a first polarizing sheet 41, an emergent surface of the liquid crystal display panel 3 is provided with a second polarizing sheet 42, and the bandpass filters 1 are disposed between the first polarizing sheet 41 and the liquid crystal display panel 3.

In the present embodiment, the bandpass filter 1 is a tri-basspand filter, the basspand filter 1 can be directly manufactured on the lower substrate of the liquid crystal display panel 3, the narrowband filtering is realized without increasing the thickness of a display module, and a gamut range is improved.

For example, in FIG. 2, the liquid crystal display panel 3 includes an array substrate 31 and a color filter substrate 32 which are sequentially disposed on an emergent side of the backlight source 2, and the bandpass filters 1 are disposed on the array substrate 31.

Figure 3:
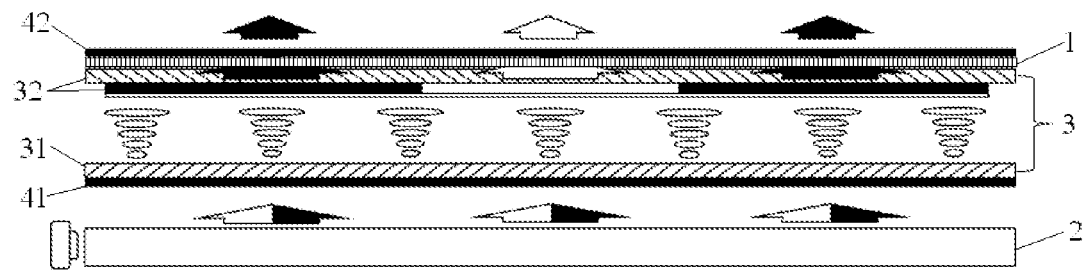
FIG. 3 is a structural schematic diagram of a display device provided by at least one embodiment of the present disclosure.

FIG. 3 is a structural schematic diagram of a display device provided by a third embodiment of the present disclosure. The display device includes a backlight source 2 and a liquid crystal display panel 3, bandpass filters 1 being disposed on an emergent side of the liquid crystal display panel 3.

Further, an incident surface of the liquid crystal display panel 3 is provided with a first polarizing sheet 41, an emergent surface of the liquid crystal display panel 3 is provided with a second polarizing sheet 42, and the bandpass filters 1 are disposed between the liquid crystal display panel 3 and the second polarizing sheet 42.

In the present embodiment, the bandpass filters 1 are tri-bandpass filters, the bandpass filters 1 can be directly manufactured on an upper substrate of the liquid crystal display panel 3, the narrowband filtering is realized without increasing the thickness of the display module, and the gamut range is improved.

For example, in FIG. 3, the liquid crystal display panel 3 includes an array substrate 31 and a color filter substrate 32 which are sequentially disposed on the emergent side of the backlight source 2, and the bandpass filters 1 are disposed on the color filter substrate 32.

In addition, since the reflectivity of the bandpass filters 1 to the light is higher than that of the glass to light, except for the improved gamut, the display device provided by the present embodiment is also favorable for increasing the reflectivity of the display device, and adaptively configured to be on some products needing prominent reflection performances, for example, mirror surface products.

It is noted that the bandpass filters 1 can also be arranged on an emergent side of the second polarizing sheet 42, which is not repeated herein.

In the above three specific embodiments, the bandpass filters 1 are tri-bandpass filters, and are capable of adjusting the central wavelengths and half-height peak widths of the red light, green light and blue light at the same time.

Preferably, the range of the central wavelength of the red light which can transmit through the bandpass filters 1 is 610-690 nm, and the range of the half-height peak width of the red light which can transmit through the bandpass filters 1 is 20-60 nm, so as to realize the narrowband filtering on the red light.

The range of the central wavelength of the green light which can transmit through the bandpass filters 1 is 490-570 nm, and the range of the half-height peak width of the green light which can transmit through the bandpass filters 1 is 20-60 nm, so as to realize the narrowband filtering on the green light.

The range of the central wavelength of the blue light which can transmit through the bandpass filters 1 is 400-480 nm, and the range of the half-height peak width of the blue light which can transmit through the bandpass filters 1 is 20-60 nm, so as to realize the narrowband filtering on the blue light.

Figure 4:
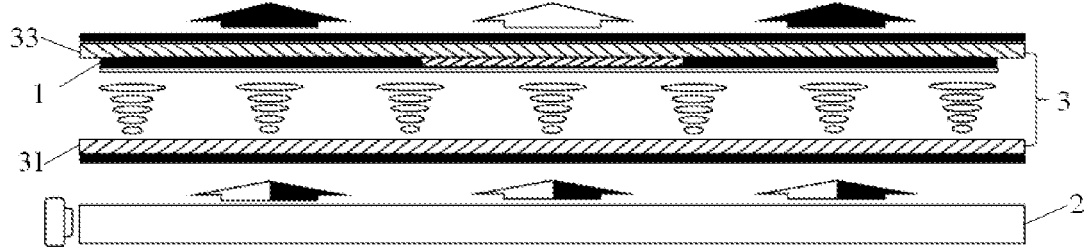
FIG. 4 is a structural schematic diagram of a display device provided by at least one embodiment of the present disclosure.

FIG. 4 is a structural schematic diagram of a display device provided by a fourth embodiment of the present disclosure. In the present disclosure, the bandpass filters 1 are mono-bandpass filters in one-to-one correspondence with the red, green and blue sub-pixel units, and each mono-bandpass filter 1 is capable of adjusting the central wavelength and half-height peak width of the color corresponding thereto.

Specifically, the bandpass filter 1' includes a plurality of filtering units arranged in an array, and each filtering unit includes a red subunit, a green subunit and a blue subunit, and the filtering units are in one-to-one correspondence with to the pixel units of the display device.

Wherein, the mono-bandpass filters corresponding to the red sub-pixel units are configured to perform narrowband filtering on the red light; the mono-bandpass filters corresponding to the green sub-pixel units are configured to perform narrowband filtering on the green light; and the mono-bandpass filters corresponding to the blue sub-pixel units are configured to perform narrowband filtering on the blue light.

That is, each sub-pixel unit corresponds to one mono-bandpass filter same as it in color, and the one mono-bandpass filter is configured to perform narrowband filtering on the emergent light of the corresponding sub-pixel unit to improve the gamut of the display device.

Preferably, as shown in FIG. 4, the display device includes a backlight source 2 and a liquid crystal display panel 3, wherein the liquid crystal display panel 3 includes an array substrate 31 and a counter substrate 33 which are sequentially disposed on an emergent side of the backlight source 2, and the bandpass filters 1 can replace the original color filters, that is, the bandpass filters 1 are disposed on a side of the counter substrate 33 facing the array substrate 31.

It can be seen that the bandpass filters 1 in the present embodiment function as color film layer and narrowband filtering layer, and the high gamut display can be realized without increasing the process steps and product thickness.

In addition, the display panel in the present disclosure can not only be the liquid crystal display panel as shown in FIG. 1 to FIG. 4, but also be a light-emitting diode display panel as long as the bandpass filters are disposed on the emergent side of the light-emitting diode display panel.

In the present disclosure, the central wavelengths and half-height peak widths of the red light, green light and blue light can be continuously adjusted in a certain range by adopting the bandpass filters, such that the narrowband filtering of the red light, green light and blue light can be realized. By adopting the structure of the present disclosure, the high gamut is favorably realized and the display effect is improved.

It can be understood that the above embodiments are exemplary embodiments merely intended for explaining the principle of the present disclosure; however, the present disclosure is not limited thereto. Those ordinary skilled in the art can make various transformations and improvements without departing from the spirit and essence of the present disclosure, and these transformations and improvements are considered to be in the protection scope of the present disclosure.

The invention claimed is:

1. A display device, comprising a liquid crystal display panel and a backlight source, and further comprising a plurality of bandpass filters disposed in the display device and corresponding to a pixel array of the liquid crystal display panel, the bandpass filters being configured to perform narrowband filtering on light emergent from the backlight source, wherein, each of the bandpass filters is a combination of a first structure of $$\left(\frac{H}{2}L\frac{H}{2}\right)^m$$

and a second structure of $$\left(\frac{L}{2}H\frac{L}{2}\right)^n,$$

wherein, $$\left(\frac{H}{2}L\frac{H}{2}\right)^m$$

represents the first structure is comprised of m tri-layer film layers, and the tri-layer film layers are respectively: a layer of high-refractive index film layer with half optical thickness, a layer of low-refractive index film layer with one optical thickness and another layer of high-refractive index film layer with half optical thickness, wherein, $$\left(\frac{L}{2}H\frac{L}{2}\right)^n$$

represents the second structure is comprised of n tri-layer film layers, and the tri-layer film layers are respectively: a layer low-refractive index film layer with half optical thickness, a layer of high-refractive index film layer with one optical thickness and another layer of low-refractive index film layer with half optical thickness, wherein, H and L represent a high-refractive index film layer and a low-refractive index film layer with an optical thickness of $\lambda/4$, H/2 and L/2 represent a high-refractive index film layer and a low-refractive index film layer with an optical thickness of $\lambda/8$, m and n are positive integers, and $\lambda$ is a wavelength of light.

2. The display device according to claim 1, wherein the pixel array includes a plurality of pixel units, each of the pixel units includes three sub-pixel units; and the plurality of bandpass filters are tri-bandpass filters in one-to-one correspondence with the respective pixel units, and the tri-bandpass filter is capable of adjusting central wavelengths and half-height peak widths of red light, green light and blue light emitted from the three sub-pixel units constituting one pixel unit.

3. The display device according to claim 1, wherein the pixel array includes a plurality of pixel units, each of the pixel units includes three sub-pixel units;

the plurality of bandpass filters are mono-bandpass filters in one-to-one correspondence with the respective pixel units; and each of the mono-bandpass filters is capable of adjusting a central wavelength and a half-height peak width of light of color corresponding thereto.

4. The display device according to claim 1, wherein the bandpass filters are disposed between the backlight source and the liquid crystal display panel, and are disposed on an emergent surface of the backlight source, or disposed on an incident surface of the liquid crystal display panel.

5. The display device according to claim 4, wherein the incident surface of the liquid crystal display panel is provided with a first polarizing sheet, arid the emergent surface of the liquid crystal display panel is provided with a second polarizing sheet;

the bandpass filters are disposed between the backlight source and the first polarizing sheet;

or, the bandpass filters are disposed between the first polarizing sheet and the liquid crystal display panel.

6. The display device according to claim 5, wherein the liquid crystal display panel includes an array substrate and a color filter substrate which are sequentially disposed on an emergent side of the backlight source, the array substrate is provided with the pixel array, and the bandpass filters are disposed on the incident surface of the array substrate.

7. The display device according to claim 1, wherein the bandpass filters are disposed on an emergent surface of the liquid crystal display panel.

8. The display device according to claim 7, wherein an incident surface of the liquid crystal display panel is provided with a first polarizing sheet, and the emergent surface of the display panel is provided with a second polarizing sheet; and the bandpass filters are disposed between the liquid crystal display panel and the second polarizing sheet.

9. The display device according to claim 8, wherein the liquid crystal display panel includes an array substrate and a color filter substrate which are sequentially disposed on an emergent side of the backlight source, and the bandpass filters are disposed on the emergent surface of the color filter substrate.

10. The display device according to claim 1, wherein the liquid crystal display panel includes an array substrate and a counter substrate which are sequentially disposed on an emergent side of the backlight source, and the bandpass filters are disposed on a side of the counter substrate facing the array substrate.

11. The display device according to claim 2, wherein the bandpass filters are disposed between the backlight source and the liquid crystal display panel, and are disposed on an emergent surface of the backlight source, or disposed on an incident surface of the liquid crystal display panel.

12. The display device according to claim 3, wherein the bandpass filters are disposed between the backlight source and the liquid crystal display panel, and are disposed on an emergent surface of the backlight source, or disposed on an incident surface of the liquid crystal display panel.

13. The display device according to claim 11, wherein the incident surface of the liquid crystal display panel is provided with a first polarizing sheet, and the emergent surface of the liquid crystal display panel is provided with a second polarizing sheet.

the bandpass filters are disposed between the backlight source and the first polarizing sheet;

or, the bandpass filters are disposed between the first polarizing sheet and the liquid crystal display panel.

14. The display device according to claim 12, wherein the incident surface of the liquid crystal display panel is provided with a first polarizing sheet, and the emergent surface of the liquid crystal display panel is provided with a second polarizing sheet.

the bandpass filters are disposed between the backlight source and the first polarizing sheet;

or, the bandpass filters are disposed between the first polarizing sheet and the liquid crystal display panel.

15. The display device according to claim 13, wherein the liquid crystal display panel includes an array substrate and a color filter substrate which are sequentially disposed on an emergent side of the backlight source, the array substrate is provided with the pixel array, and the bandpass filters are disposed on the incident surface of the array substrate.

16. The display device according to claim 14, wherein the liquid crystal display panel includes an array substrate and a color filter substrate which are sequentially disposed on an emergent side of the backlight source, the array substrate is provided with the pixel array, and the bandpass filters are disposed on the incident surface of the array substrate.

17. The display device according to claim 2, wherein the bandpass filters are disposed on an emergent surface of the liquid crystal display panel.

18. The display device according to claim 3, wherein the bandpass filters are disposed on an emergent surface of the liquid crystal display panel.

19. The display device according to claim 17, wherein an incident surface of the liquid crystal display panel is provided with a first polarizing sheet, and the emergent surface of the display panel is provided with a second polarizing sheet; and the bandpass filters are disposed between the liquid crystal display panel and the second polarizing sheet.

20. The display device according to claim 18, wherein an incident surface of the liquid crystal display panel is provided with a first polarizing sheet, and the emergent surface of the display panel is provided with a second polarizing sheet; and the bandpass filters are disposed between the liquid crystal display panel and the second polarizing sheet.

* * * * *